United States Patent [19]

Schifrin

[11] Patent Number: 5,225,294
[45] Date of Patent: Jul. 6, 1993

[54] NON-RECHARGEABLE BATTERY PACK

[75] Inventor: Arthur Schifrin, Brooklyn, N.Y.

[73] Assignees: FH Group; EK Group, Brooklyn, N.Y.

[21] Appl. No.: 899,481

[22] Filed: Jun. 16, 1992

[51] Int. Cl.⁵ .................... H01M 2/10; H01M 2/02
[52] U.S. Cl. .................................. 429/99; 429/159; 429/176; 429/185
[58] Field of Search .................... 429/99, 159, 96, 176, 429/100, 185

[56] References Cited

U.S. PATENT DOCUMENTS

| 4,599,283 | 7/1986 | Thiele et al. | 429/99 |
| 4,666,278 | 5/1987 | Uematsu et al. | 429/99 X |
| 5,038,972 | 8/1991 | Muderlak et al. | 222/36 X |

FOREIGN PATENT DOCUMENTS 2000395 1/1979 United Kingdom ............... 429/99

Primary Examiner—John S. Maples
Attorney, Agent, or Firm—Ezra Sutton

[57] ABSTRACT

A disposable, non-rechargeable battery pack for a video camera including alkaline batteries having a rectifier diode to prevent the batteries from being recharged.

12 Claims, 2 Drawing Sheets

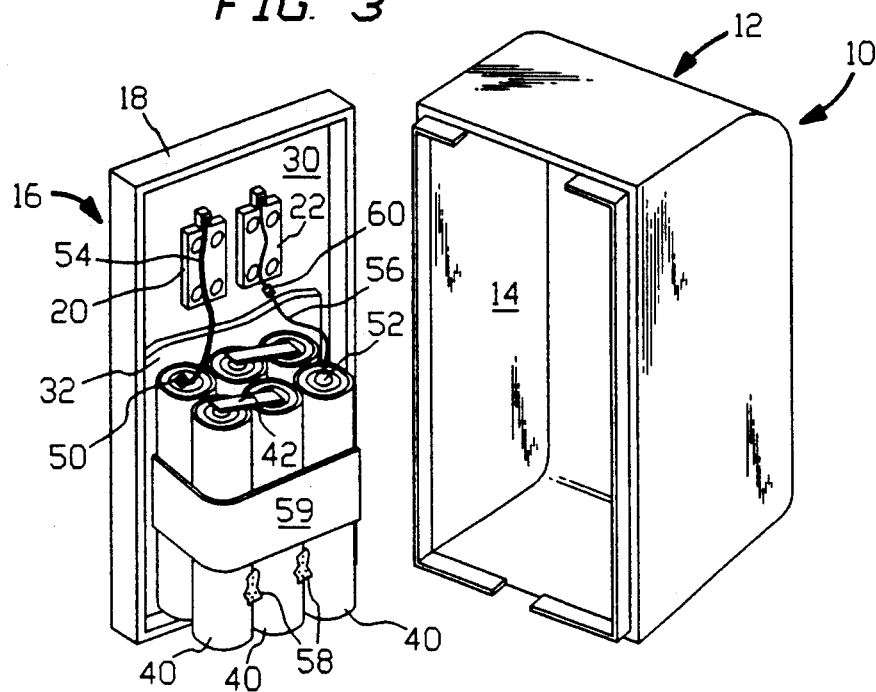
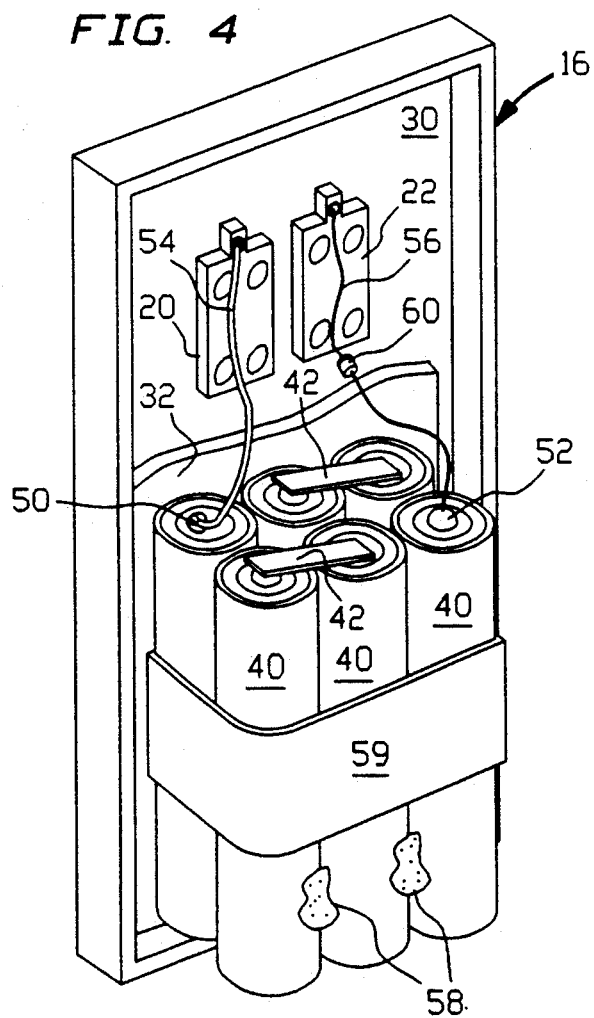
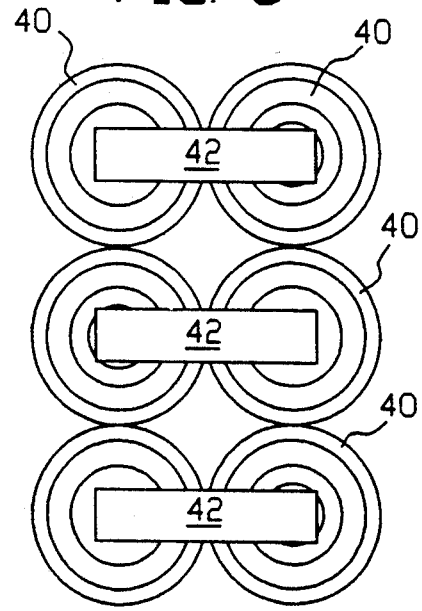

NON-RECHARGEABLE BATTERY PACK

FIELD OF THE INVENTION

The present invention relates to a disposable, non-rechargeable battery pack for a video camera which is immediately available for use without recharging.

BACKGROUND OF THE INVENTION

Rechargeable batteries for video cameras and the like are well known. Typically, they are nickel-cadmium batteries and must be recharged before they are used. Such rechargeable batteries are expensive, and they are not always readily available to the user of the video camera. Also, in many instances, the user does not have the time to recharge the battery before it is used.

It is therefore an object of the present invention to provide a disposable, inexpensive, immediately useable, non-rechargeable battery pack for a video camera to be used in place of a rechargeable battery.

It is also an object of the present invention to provide a battery pack for a video camera which is always ready for use, without a delay for recharging, and which has a shelf life of approximately three years and which universally fits most video cameras.

It is a further object of the present invention to provide the non-rechargeable battery pack with a safety device to insure that it cannot be recharged and cause damage, such as an explosion.

It is a still further object of the present invention to provide a disposable, inexpensive, non-rechargeable battery pack formed of alkaline batteries to provide one hour or more of use for a 6 volt, 8 mm camcorder video camera.

SUMMARY OF THE INVENTION

In accordance with the present invention, there is provided a disposable, non-rechargeable, alkaline battery pack for a video camera which is always ready for use without recharging and may be used in place of a rechargeable battery. It includes a housing having electrical contacts for engaging the electrical contacts of a video camera and having mechanical means for mounting the housing on a video camera. The housing is sealed and has an inner compartment, which, in the preferred embodiment, holds six alkaline batteries disposed within the compartment. The batteries are connected in series to provide a 9 volt supply to the video camera. A rectifier is connected in series between the batteries and the electrical contacts to prevent the batteries from being recharged. The battery pack may be disposed of after use.

BRIEF DESCRIPTION OF THE DRAWINGS

Further objects, features, and advantages of the present invention will become apparent upon consideration of the detailed description of the presently-preferred embodiment, when taken in conjunction with the accompanying drawings wherein:

FIG. 3 is a perspective view of the inside of the battery pack;

FIG. 4 is an enlarged view of the battery pack; and

FIG. 5 is a bottom view of the batteries showing them connected in series.

DESCRIPTION OF THE PREFERRED EMBODIMENT

Figure 1:
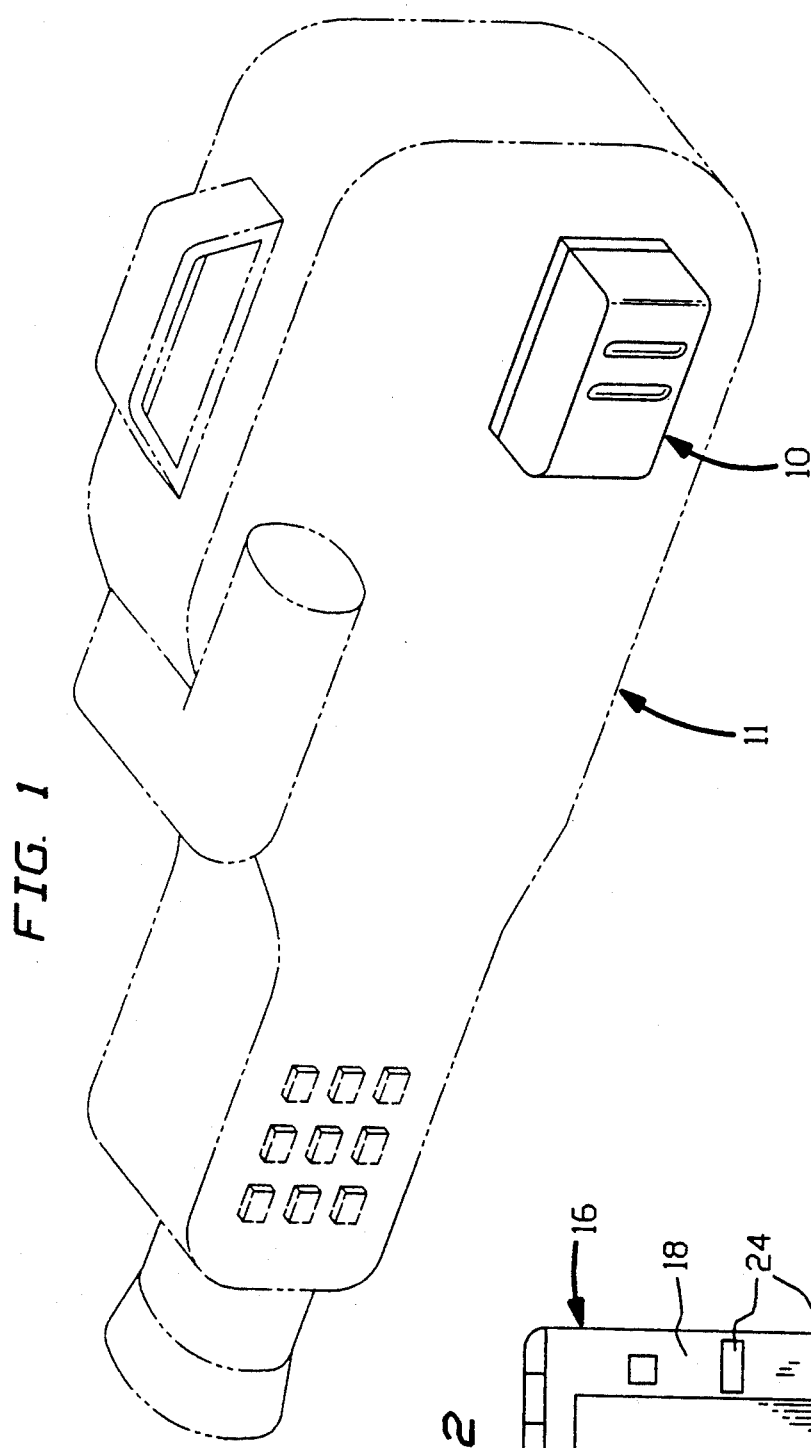
FIG. 1 is a view of the battery pack of the present invention mounted on a video camera.
Figure 2:
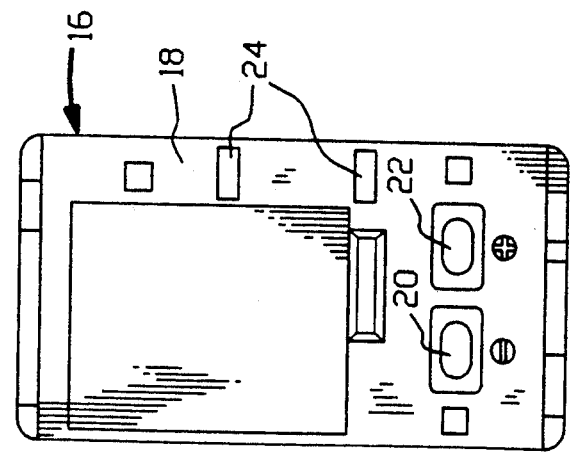
FIG. 2 is a view of the back of the battery pack.

FIG. 1 shows a battery housing 10 embodying the present invention mounted on a video camera 11. As shown in FIGS. 2 and 3, housing 10 includes a housing section 12 having a battery compartment 14 and a wall section 16 which have a snap fit. The housing 10 is formed of "ABS" plastic, and the two housing sections are sealed when they are closed. As shown in FIG. 2, the outer surface 18 of wall section 16 includes electrical contacts 20, 22 for engaging the electrical contacts of a video camera and a locking device 24 for mechanically mounting the housing 10 on video camera 11.

The inner surface 30 of wall section 16 includes the other side of electrical contacts 20, 22 and a cushioning pad 32 for cushioning the batteries to be placed in battery compartment 14.

In the preferred embodiment, six (6) alkaline batteries 40, each being 1.5 volts, are connected in series by metal connectors 42 to form a 9 volt supply. The batteries are non-rechargeable. It should be understood that other size batteries may be used to provide the 9 volt supply. For example, three 3 volt batteries may be employed or one 9 volt battery. The terminals 50 and 52 of the batteries are connected to wires 54 and 56, respectively, which are, in turn, connected to the electrical contacts 20 and 22. Preferably, the six batteries 40 are held together as a unit, such as by welding 58 or tape 59, or the like, and are disposed in compartment 14.

As shown in FIG. 4, semiconductor rectifier diode 60 is connected in series with wire 56 to prevent the batteries from being recharged. In the preferred embodiment, rectifier diode 60 is a Schottky barrier rectifier sold by Semitronics and identified as Model No. IN5817. It has a low power loss, high efficiency, high current capability, high surge capacity, a maximum RMS voltage of 14, a maximum DC blocking voltage of 20, and a current of one ampere. In the circuit of the present invention, rectifier diode 60 has only a 0.3 voltage drop across it. As a result, the camera receives approximately 8.7 volts of the 9 volt supply although the rest of the circuit also provides a minimal voltage drop.

This particular rectifier diode 60 was selected, since it maximizes the voltage supply to the camera. Other rectifier diodes, which provide a 1 volt voltage drop, were tried in the circuit, but the video camera either would not operate or would only operate for a few minutes with such diodes.

Rectifier diode 60 allows current to flow in only one direction, to the camera, and not to the batteries, so that batteries 40 cannot be recharged with rectifier 60 in the circuit. Rectifier 60 also acts as a safety feature, since alkaline batteries have a tendency to explode if one attempts to recharge them.

The housing 10 with the batteries is sealed for safety reasons, so that the user cannot have access to the batteries or circuit. During use, the battery pack will last for approximately one hour and is then disposed of. The battery pack has a shelf life of approximately three years, and during that period, it is always immediately available for use without recharging. The housing 10 is made to be universal to fit most video cameras.

In accordance with the present invention, other voltage amounts may be employed. For example, a video camera requiring a 12 volt supply would have ten 1.5 volt batteries connected in series (total of 15 volts) to supply the required 12 volts. Similarly, a video camera requiring a 7.2 volt supply would have eight 1.5 volt batteries connected in series (total of 12 volts) to supply the required 7.2 volts. Also, a video camera requiring a 9.6 volt supply would have nine 1.5 volt batteries connected in series (total of 13.5 volts) to supply the required 9.6 volts.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A disposable, non-rechargeable, alkaline battery pack for a video camera immediately available for use without charging and useable in place of a rechargeable battery, comprising:
    a) a housing having electrical contacts for engaging the electrical contacts of a video camera and having mechanical means for mounting said housing on a video camera;
    b) said housing being sealed and having a compartment;
    c) two or more alkaline batteries disposed within said compartment, said batteries being connected in series to provide a 9 volt supply;
    d) means for holding said batteries together as a unit; and
    e) a rectifier diode connected in series between said batteries and said electrical contacts to prevent said batteries from being recharged, so that said battery pack may be disposed of after use.

2. A battery pack in accordance with claim 1, wherein said housing fits different video cameras.

3. A battery pack in accordance with claim 1, including six 1.5 volt alkaline batteries connected in series to provide said 9 volt supply.

4. A battery pack in accordance with claim 1, wherein said rectifier diode is a Schottky barrier rectifier for conducting a current of one ampere in one direction, only toward said electrical contacts and away from said batteries.

5. A battery pack in accordance with claim 1, wherein said housing includes a cushioning pad for cushioning said batteries against movement within said housing.

6. A battery pack in accordance with claim 1, wherein said housing is formed of "ABS" plastic.

7. A battery pack in accordance with claim 1, wherein said batteries have a shelf life of approximately three years.

8. A disposable, non-rechargeable, alkaline battery pack for a video camera immediately available for use without charging and useable in place of a rechargeable battery, comprising:
    a) a housing having electrical contacts for engaging the electrical contacts of a video camera and having mechanical means for mounting said housing on a video camera;
    b) said housing being sealed and having a compartment;
    c) two or more alkaline batteries disposed within said compartment, said batteries being connected in series to provide the required voltage supply to the video camera;
    d) means for holding said batteries together as a unit; and
    e) a rectifier diode connected in series between said batteries and said electrical contacts to prevent said batteries from being recharged, so that said battery pack may be disposed of after use.

9. A battery pack in accordance with claim 8, wherein six 1.5 volt alkaline batteries are connected in series to replace a 6 volt rechargeable battery.

10. A battery pack in accordance with claim 8, wherein ten 1.5 volt alkaline batteries are connected in series to replace a 12 volt rechargeable battery.

11. A battery pack in accordance with claim 8, wherein eight 1.5 volt alkaline batteries are connected in series to replace a 7.2 volt rechargeable battery.

12. A battery pack in accordance with claim 8, wherein nine 1.5 volt alkaline batteries are connected in series to replace a 9.6 volt rechargeable battery.

* * * * *